UNITED STATES PATENT OFFICE.

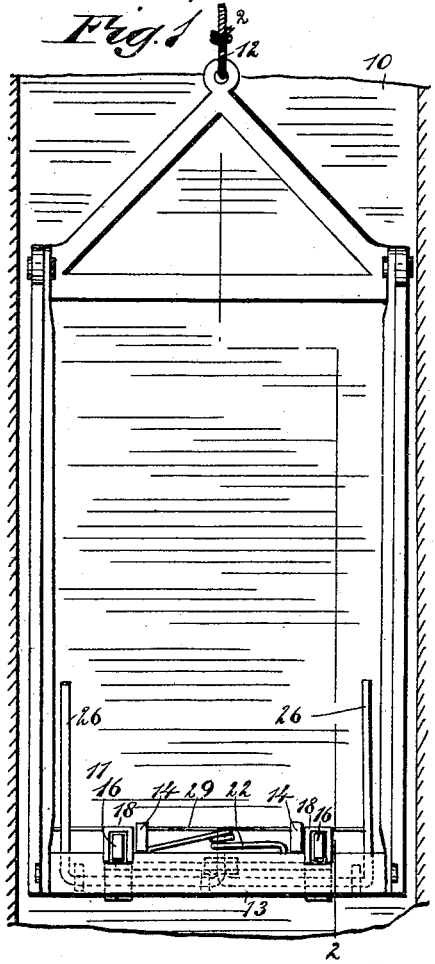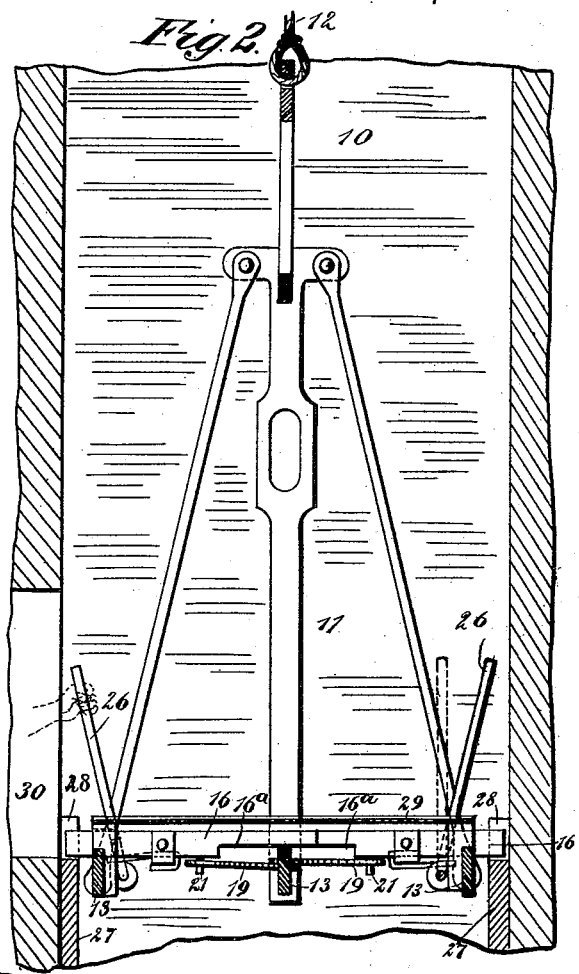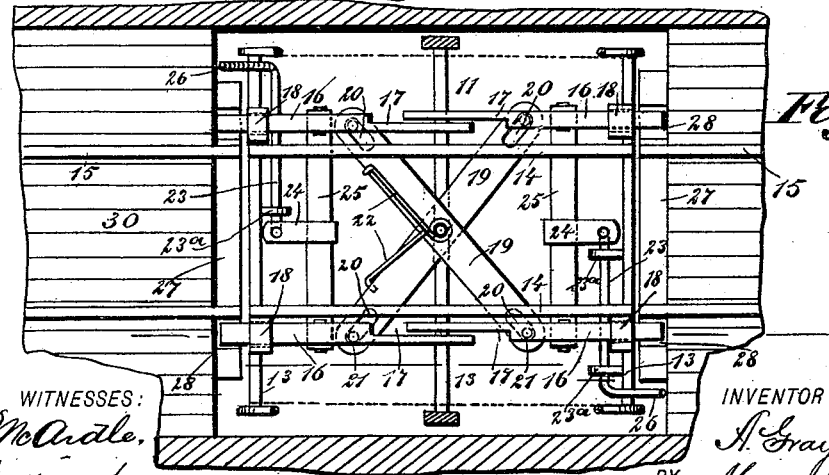

ALEXANDER GRAY, OF BUTTE CITY, MONTANA.

CHAIR FOR MINING-CAGES.

SPECIFICATION forming part of Letters Patent No. 466,163, dated December 29, 1891.

Application filed July 13, 1891. Serial No. 399,318. (No model.)

*To all whom it may concern:*

Be it known that I, ALEXANDER GRAY, of Butte City, in the county of Silver Bow and State of Montana, have invented a new and Improved Resting-Chair for Mining-Cages, of which the following is a full, clear, and exact description.

My invention relates to improvements in resting-chairs for cages such as are used in mining-shafts. It is customary to lower these cages to certain stations in the shaft, and it is a very general practice to use stationary chairs which will stop and support the cage when it comes in contact with them, the chairs being arranged at the stations or points of the shaft at which the cage is to stop. The hoisting engineer frequently forgets the station to which a cage is to be lowered, and as a result he permits the cage to descend with such speed that when it comes suddenly in contact with the stationary resting-chairs both the chairs and cage are demolished, and the accident is frequently attended by loss of life.

The object of my invention is to obviate these difficulties and produce a simple device which may be operated from the cage or by a station-tender, which will permit the cage to be stopped at a desired point, and which when not in use will be entirely out of the way, so that the cage cannot be accidentally stopped.

To this end my invention consists in certain features of construction and combinations of parts, which will be hereinafter described and claimed.

Reference is to be had to the accompanying drawings, forming a part of this specification, in which similar figures of reference indicate corresponding parts in all the views.

Figure 1 is a side elevation of a cage provided with my improved resting-chairs, the cage being shown in position in a shaft. Fig. 2 is a vertical cross-section on the line 2 2 in Fig. 1; and Fig. 3 is a sectional plan of the cage and attachments, showing the cage in position at a station.

The shaft 10 is adapted to permit the passage of a cage 11 through it, and this cage may be of any approved form, and is raised by a cable 12 in the ordinary way. The cage-bottom is formed, essentially, by the cross-pieces 13, which support the rails 14, upon which a car may be run in the usual way, and these rails align with rails 15, arranged at any desired level in the mine.

On the outer sides of the rails 14 are the chairs 16, there being two chairs at each rail, and these chairs are recessed on the under side, as shown at $16^a$ in Fig. 2, to permit them to slide easily over the center cross-piece 13, and they are also recessed at their inner ends, which overlap, as shown at 17 in Fig. 3, so that they may have the necessary longitudinal movement. The chairs are held to move parallel with the rails 14 through keepers 18, and are adapted to project beyond the edges of the cage-bottom. The inner ends of the chairs, on opposite sides of the tracks, are connected by the crossed levers 19, said levers being pivoted at their intersecting point to the central cross-piece 13, and the levers are arranged to connect with diagonally-opposite chairs and are provided with longitudinal recesses 20 at the ends, which recesses receive the pins 21 on the under sides of the chairs 16, and the recesses will thus permit of the necessary movement of the levers, in order that the chairs may move longitudinally. The levers 19 are adapted to swing on their pivot, and they are normally held closed—that is, with their ends pushed near together and with the chairs drawn inward upon the cage-bottom—by means of a spring 22, which spring is coiled around the pivot of the levers and has its ends pressing against the edges of both levers.

On the opposite sides of the cage, and on those sides which are adapted to be brought opposite the track-rails 15, are horizontal rods 23, which are mounted to turn in suitable bearings $23^a$ and which at their inner ends are turned up to form cranks, which are connected by means of metallic strips 24 with cross-pieces 25, which cross-pieces extend beneath the rails 14 and connect the opposite chairs 16. The outer ends of the rods 23 are bent upward to form cranks 26, and by tilting the cranks the chairs 16 may be forced outward in opposition to the spring 22.

On opposite sides of the shaft and adjacent to a station 30 are wall-plates 27, which are secured to the shaft in any convenient manner and which have notches 28 near their upper corners, the notches being adapted to receive the outer ends of the chairs 16 when the latter are forced outward by a crank-rod 23. It will be noticed that the crank 26 of the rod 23 is in such a position that it may be operated by the station-tender when it comes opposite a station, or it may be operated by a person riding upon the cage. The wall-plates, too, may be arranged at intervals throughout the shaft, and the cage may be stopped at any point where the wall-plates occur, in order to repair damages or to mend a defective place in the shaft. The cage is provided with a metallic floor 29, which covers everything, except the rails 14 and the cranks 26.

The operation of the device is as follows: The cage is lowered in the usual way and when it comes opposite the wall-plates 27, at which it is to be stopped, the operator tilts one of the cranks 26 and the rod 23, connected therewith, thus forcing out the chairs 16, and the ends of the chairs will enter the notches 28 in the wall-plates 27, and will thus support the cage. The weight of the cage will prevent the chairs from being drawn inward by the spring 22, so that the cage will rest securely in place; but when the cage is raised by the cable the friction will be removed from the chairs, and the spring 22 will shut up the levers 19 and draw in the chairs, so that they will need no attention from the operator and will be out of the way of any obstruction in the shaft.

From the foregoing description it will be seen that the chairs may be very quickly and easily worked, and that they are in a measure automatic, as they assume their proper position when the cage is started upward.

Having thus fully described my invention, I claim as new and desire to secure by Letters Patent—

1. The combination, with the cage, of two pairs of sliding chairs on the under side thereof, the chairs of each pair sliding in opposite directions, centrally-pivoted crossed levers having a sliding pivotal connection at their ends with diagonally-opposite chairs, a spring normally holding the chairs retracted, and a lever mechanism connected with a chair of each pair, substantially as set forth.

2. The combination, with a cage of the character described, and wall-plates arranged in the path of the cage, of sliding chairs mounted upon the cage-bottom and adapted to engage the wall-plates, said chairs being arranged in pairs near opposite sides of the cage, spring-pressed cross-levers connecting the diagonally-opposite chairs, and a lever mechanism for moving the chairs against the spring-pressed levers, substantially as described.

3. The combination, with a cage and sliding chairs mounted thereon and arranged in pairs, as described, of spring-pressed levers pivoted centrally upon a support and arranged to connect the diagonally-opposite chairs, cross-pieces connecting the opposite chairs, and crank-rods mounted upon the cage and connected with the cross-pieces, substantially as described.

ALEXANDER GRAY.

Witnesses:
ANDRO MAICHEL,
CHAS. STEWART.